United States Patent Office 3,754,050
Patented Aug. 21, 1973

3,754,050
PROCESS OF PURIFYING CONJUGATED DIOLEFINES
Coenraad J. Duyverman, Sittard, and Jacques M. M. Miessen, Eysden, Netherlands, assignors to Stamicarbon N.V., Heerlen, Netherlands
No Drawing. Filed Feb. 24, 1971, Ser. No. 118,563
Claims priority, application Netherlands, Feb. 25, 1970, 7002631
Int. Cl. C07c 7/12
U.S. Cl. 260—681.5 R             5 Claims

ABSTRACT OF THE DISCLOSURE

Allenes, acetylenes and vinyl cyclohexenes are removed from conjugated diolefins by adsorption with a mixture of copper oxide and zinc oxide at a temperature between 25° C. and 175° C.

---

The present invention relates generally to a process of selectively removing impurities from conjugated diolefines and in particular to a process for selectively removing impurities from butadiene-1,3 and isoprene. The conjugated diolefines are brought into contact in the gas phase and at elevated temperature with a solid mass containing copper.

Even after careful, exhaustive purification processes, conjugated diolefines, including butadiene-1,3 and isoprene, generally contain small amounts of impurities, such as allenes, acetylenes or vinyl cyclohexenes. If the diolefines containing these impurities are used as feed materials in various polymerization processes, the impurities contained therein can rapidly poison the catalysts used in the polymerization processes. In these polymerization processes, it is important that the amount of catalyst per kg. of product produced should be kept as low as possible, and that subsequent removal and regeneration of the catalyst, for instance by washing, be avoided. Thus, it is of great importance to remove catalysts poisons, as far as is practicable, from the diolefines used as feed materials.

In Canadian Pat. No. 494,825, it is disclosed that conjugated dienes can be stripped of acetylenes by passing the diolefines in the gas phase over a mass containing iron, copper or mixtures of iron and copper at temperatures between 140° C. and 375° C. However, for effective removal of acetylenes by the process proposed in the Canadian Pat. No. 494,825, the temperature of the diolefines must be at least 190° C., and there is also a considerable loss of diolefine content during the process.

According to the present invention, a process is provided for removing the impurities from conjugated diolefines wherein the loss of conjugated diolefine is almost entirely avoided. The process comprises contacting the conjugated diolefine at atmospheric or a higher pressure, and at a temperature below 175° C., with a solid mass containing copper and zinc. Impurities such as allenes, acetylenes, vinyl acetylenes, and vinyl cyclohexenes are essentially completely removed from the conjugated diolefines by the process of this invention. By essentially completely removed is meant that the amounts present are no longer analytically detectable (detection limit 1 p.p.m.).

In U.S. patent application Ser. No. 833,091, filed June 13, 1969, now U.S. Pat. No. 3,549,719, it is disclosed that traces of acetylenes and propyne can be removed from ethylene by contacting the ethylene with a mass containing copper oxide and zinc oxide. The acetylene and propyne are very easily polymerized and removed from the ethylene gas by adsorption on the copper oxide, zinc oxide mass. Conjugated diolefines have a strong tendency to polymerize, and it would be expected in view of the teaching of U.S. application Ser. No. 833,091 that contacting diolefines with copper and zinc would result in the polymerization of the diolefines. Surprisingly, however, this does not happen when the diolefine is contacted with the mass of copper and zinc at temperatures less than 175° C.

A preferred mode of performing the process of this invention comprises passing the conjugated diolefine, in the gas phase, through a tubular reactor filled with the solid mass containing copper and zinc, at atmospheric or at higher pressure, and at an operating temperature between 25° and 175° C., preferably between 40° C. and 175° C. The conjugated diolefine can be in the unliluted state or it can be mixed with, say, nitrogen, saturated hydrocarbons, olefines or other conjugated diolefines before being contacted with the solid mass of copper and zinc.

The influence of the temperature on the selective removal of impurities from the conjugated diolefines is such that the purification capacity of the mass of copper and zinc increases as its temperature is increased. The lower temperature limit is determined by insufficient effectiveness of the copper, zinc mass and the upper limit by the occurrence of unwanted reactions between the copper, zinc mass and the conjugated diolefine, for instance, polymerization of the diolefine and oxidation by the oxidic copper, zinc mass. A temperature between 50° C. and 140° C. is preferably employed. The process of this invention can be carried out at atmosphereic pressure as well as at higher pressures, for instance, of the order of 1 to 25 bars.

The copper, zinc mass is preferably composed of copper oxide and zinc oxide. The copper oxide, zinc oxide mass can be prepared by coprecipitation of copper and zinc hydroxides from an aqueous solution of a copper salt and a zinc salt by means of a basic reagent. The hydroxides are thermally decomposed to corresponding oxides. The copper oxide, zinc oxide mass can also be prepared by impregnation of zinc oxide with a soluble copper salt (e.g., copper nitrate), followed by thermal decomposition of the copper salt to copper oxide. A further method of preparing the copper oxide, zinc oxide mass is precipitation of a copper compound (copper hydroxide) onto zinc oxide from a copper salt solution in which the zinc oxide is present in suspension, followed by thermal decomposition of the copper compound.

Any of the above-mentioned methods produces a fine dispersion of copper oxide on zinc oxide, which can be used as the solid mass in practicing the present invention. The atomic copper-to-zinc ratio of the mass may be between 1:1 and 1:10. An unduly low copper content reduces the activity of the solid mass and thus necessitates the use of large reactor volumes, which is economically and technically unattractive. If the copper content is too high, however, the effectiveness of the mass per unit weight of copper is reduced and, in addition, the regeneration of the mass becomes more difficult. A copper-to-zinc ratio of 1:1.5 to 1:6 is preferable.

The copper, zinc mass absorbs the impurities contained in the conjugated diolefine feed gas and eventually becomes saturated or loaded to a point where its activity is reduced. The copper, zinc mass, however, can be regenerated an unlimited number of times without noticeably impairing its effectiveness. The regeneration is carried out by contacting the copper, zinc mass with an oxygenous gas at 175° to 250° C. By preference, a small amount of water is added to the gas. The products removed in the regeneration are the polymer-like deposits of the acetylenes, allenes, etc. The adsorption capacity of a copper, zinc mass having a Cu/Zn ratio of about 1:2, prepared by any of the methods mentioned above, is about 2 moles of acetylenes and allenes per kg. of the mass.

The invention will be understood more readily by reference to the following examples; however, these examples are intended to illustrate the invention and are not to be construed to limit the scope of the invention.

EXAMPLE I

At atmospheric pressure, and at various temperatures, butadiene-1,3 was passed through a tubular reactor filled with 20 ml. (30 g.) of a purification mass, at a gas flow rate of 10 liters of butadiene-1,3 per hour. The purification mass was a CuO/ZnO mass containing 26% wt. of Cu and 51% of Zn. Its specific surface area was 30 square meters/gram. In addition to butadiene-1,3, the feed contained 0.45% vol. of alkanes and alkenes, less than 1 p.p.m. of acetylene, less than 1 p.p.m. of propyne, less than 1 p.p.m. of propadiene, 3 p.p.m. butadiene-1,2, 4 p.p.m. of butyne-1, 2 p.p.m. of butyne-2 and 260 p.p.m. of vinyl acetylene.

With a feed gas temperature of 80° C., after 600 liters of butadiene had been passed through the reactor, the gas coming from the reactor contained less than 1 p.p.m. of acetylene, less than 1 p.p.m. of propyne, less than 1 p.p.m. of propadiene, less than 1 p.p.m. of butadiene-1,2, less than 1 p.p.m. of butyne-1, less than 1 p.p.m. of butyne-2 and less than 1 p.p.m. of vinyl acetylene.

Tests made in the same way at 60° C., 100° C. and 120° C. gave the same results, i.e., the amounts of allenes and acetylenes in the gas from the reactor was below 1 p.p.m.

EXAMPLE II

The butadiene-1,3 purified by the process of Example I was tested for sensitivity for polymerization and decomposition when brought into contact with the CuO-ZnO mass (the mass used in Example I), at various temperatures. Four separate tests were made wherein 10 grams of the CuO-ZnO mass in Example I was first flushed with pure nitrogen ($O_2$ less than 1 p.p.m., $H_2$ less than 1 p.p.m.) for 16 hours at the temperature for that particular test. The nitrogen treatment desorbed any butadiene - 1,3 or other contaminant which the CuO-ZnO mass may have contained and the mass was weighed. The purified butadiene-1,3 (240 liters at the temperature of the particular test) was then passed through the reactor and over the CuO-ZnO mass. The CuO-ZnO mass was then reweighed to determine the amount of polymerized butadiene-1,3 adsorbed thereon. The results of the various tests are given in the following table.

TABLE

| Reaction temp., ° C. | Polymerized butadiene on CuO-ZnO mass, percent by wt. |
| --- | --- |
| 80 | <0.001 |
| 100 | <0.001 |
| 120 | <0.001 |
| 150 | 0.005 |

While the butadiene-1,3 was being passed through, the effluent was examined for decomposition products. The vent gas did not contain any decomposition products. The results shown in the above table indicate that no polymerization or adsorption of butadiene occurred on the CuO-ZnO mass at temperatures under 150° C. and no decomposition products were contained in the effluent. At the temperature of 150° C., a minor, insignificant amount of butadiene adsorbed on the CuO-ZnO mass. At temperatures above 190° C., adsorption and decomposition of butadiene on the CuO-ZnO mass becomes considerable.

EXAMPLE III

Butadiene-1,3, contaminated with 150 p.p.m. of vinyl cyclohexene, was contacted at 120° C. and in the way described in Example I, with a CuO-ZnO mass containing 23% wt. of Cu and 50% wt. of Zn. The vinylcyclohexene content of the effluent gas from the reactor was below 10 p.p.m.

EXAMPLE IV

At 80° C., a technical-grade butadiene-1,3 was passed through a tubular reactor containing 300 ml. of the CuO-ZnO mass described in Example I, at a pressure of 2.5 atmospheres absolute. In addition to about 0.6% vol. of isobutane, n-butane, butene-1, isobutene and butene-2, the butadiene-1,3 feed contained 70 p.p.m. of butadiene-1,2, 15 p.p.m. of propadiene, 5 p.p.m. of propyne, 72 p.p.m. of butyne-1, 8 p.p.m. of vinyl acetylene and less than 1 p.p.m. of butyne-2 and acetylene.

After passing through the reactor, the butadiene-1,3 contained less than 1 p.p.m. of butadiene-1,2, propadiene, propyne, butyne-1, vinyl acetylene, butyne-2 and acetylene.

Both the unpurified and the purified butadiene-1,3 were used for semi-technical scale polymerization to polybutadiene in a hydrocarbon, under the influence of the catalyst system nickel carbonyl-titanium chloride. The yield of polybutadiene, expressed per unit time and per millimole of Ni for the purified butadiene was some 4 times that for the unpurified butadiene.

What is claimed is:

1. A process for removing allenes, acetylenes and vinyl cyclohexenes as impurities from linear conjugated diolefines, said process consisting essentially of contacting said linear conjugated diolefines containing said impurities in the vapor phase at atmospheric or higher pressure with a fine dispersion of copper oxide on zinc oxide, said linear conjugated diolefines having a temperature between about 25° C. and about 175° C.

2. A process according to claim 1 wherein the temperature is between 50° and 140° C.

3. A process according to claim 1 wherein the atomic copper to zinc ratio is between 1:1 and 1:10.

4. A process according to claim 1 wherein the atomic copper to zinc ratio is between 1:1.5 and 1:6.

5. A process according to claim 2 wherein the atomic copper to zinc ratio is between 1:1 and 1:10.

References Cited

UNITED STATES PATENTS

| 3,439,060 | 4/1969 | Kempton | 260—681.5 |
| 2,426,604 | 9/1947 | Frevel | 260—681.5 |
| 3,274,286 | 9/1966 | Reich | 260—681.5 |
| 3,327,013 | 6/1967 | Frevel et al. | 260—681.5 |
| 3,459,824 | 8/1969 | Nelson et al. | 260—681.5 |
| 3,636,127 | 1/1972 | Ramquist et al. | 260—681.5 X |
| 3,549,719 | 12/1970 | Duyverman et al. | 260—677 A |

PAUL M. COUGHLAN, JR., Primary Examiner

U.S. Cl. X.R.

260—94.3